March 8, 1960

N. M. RAY 2,927,767

VALVE WITH SEAL CONSTRUCTION

Filed Aug. 1, 1956

INVENTOR.
NICOLAS M. RAY

BY

*Clark & Ott*

ATTORNEYS

United States Patent Office
2,927,767
Patented Mar. 8, 1960

2,927,767

VALVE WITH SEAL CONSTRUCTION

Nicolas M. Ray, New York, N.Y., assignor to Air Associates, Inc., Teterboro, N.J., a corporation of New Jersey Application August 1, 1956, Serial No. 601,426

1 Claim. (Cl. 251—210)

This invention relates to a valve seal construction for high pressure or high velocity fluids.

An object of the invention is to provide a seal construction for coacting valve parts having high and low pressures on opposite sides thereof or having high velocity of flow between the coacting valve faces when the valve is moved to open or closed relation. The invention particularly provides a sealing construction for a shut off or control valve for high pressure or high velocity pneumatic systems.

Another object of the invention is to provide a valve seal construction having a resilient sealing ring against which the valve element seats for closing off the flow through the valve and which is so constructed and arranged as to overcome the tendency of the resilient sealing ring to "flow" or blow out. The use of resilient sealing rings presents the problem of overcoming the tendency thereof to "flow" or blow out due to low pressure created at the sealing edge of the resilient seat by reason of the Bernoulli effect and the high pressure existing about the remaining surface of the seal. The present invention therefore provides a construction which retains the sealing ring in position and which prevents the same from being displaced when the valve element is moved to open or closed relation.

Another object of the invention is to provide a valve seal construction in which the pressure on the resilient sealing ring is balanced entirely about the ring when the valve element is "cracked open" sufficiently to admit high pressure or high velocity flow through the outlet.

With the foregoing and other objects in view, reference is now made to the following specification and accompanying drawings in which the preferred embodiment of the invention is illustrated.

Figure 1:
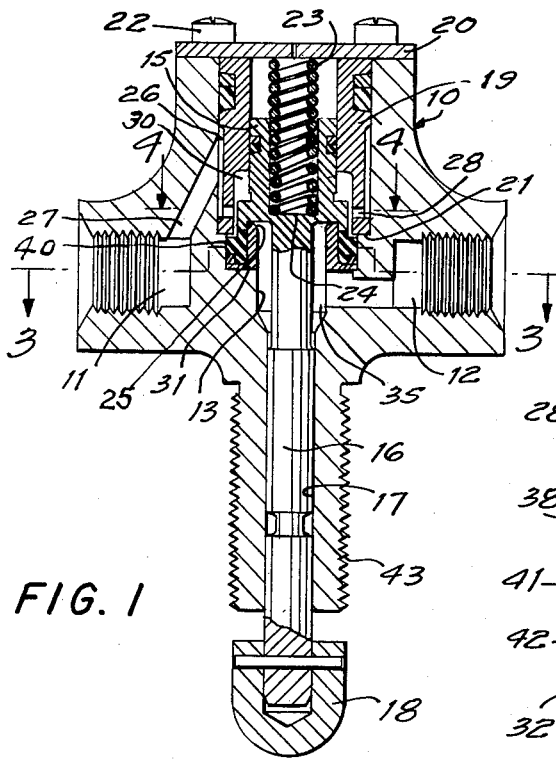
Fig. 1 is a vertical sectional view of a valve having a seal construction embodying the invention.
Figure 2:
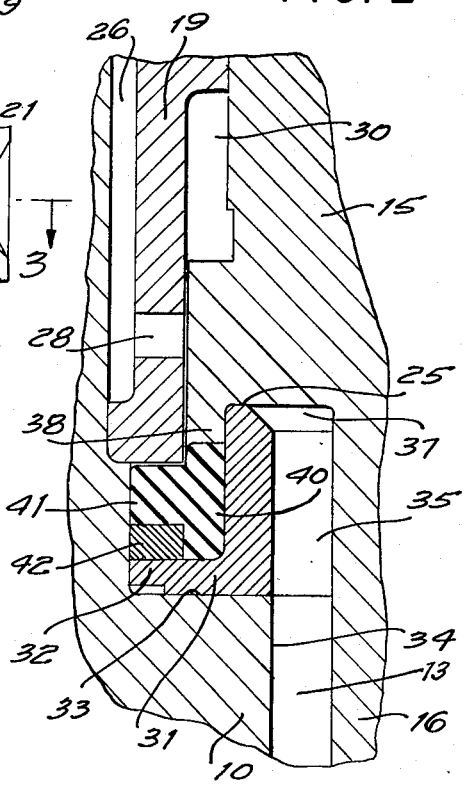
Fig. 2 is an enlarged fragmentary vertical sectional view of the valve seal construction.
Figure 3:
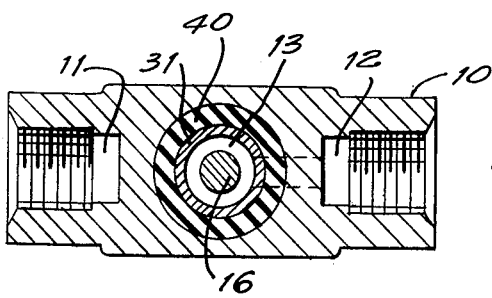
Fig. 3 is a horizontal cross sectional view, taken approximately on line 3—3 of Fig. 1.
Figure 4:
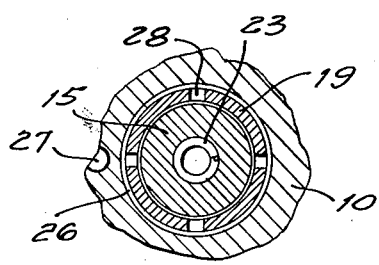
Fig. 4 is a similar view taken approximately on line 4—4 of Fig. 1.

The invention is shown in its application to a pneumatic valve for closing off the flow of fluid therethrough and which consists of a valve body 10 having inlet and outlet flow passageways 11 and 12. The said passageways open into a bore 13 in which a poppet 15 has reciprocatory movement for controlling the flow through the valve.

The poppet 15 includes a cylindrical head affixed to a valve stem 16, which slideably fits the reduced portion 17 of the bore with the stem protruding from the valve body and engaged at its outer end by a poppet cap 18. The head slideably fits a sleeve 19 arranged within the enlarged end of the bore and rigidly positioned between a cover 20 and an annular shoulder 21. The cover 20 closes the enlarged end of the bore and is secured to the valve body by screws 22 or equivalent fastening means. A coil spring 23 is arranged between the cover 20 and the bottom of a bore 24 in the head of the poppet, normally to maintain the poppet in seated engagement against a valve seat 25. The sleeve 19 is formed with a shallow peripheral recess 26 which is in communication with a flow passageway 27 and with a plurality of radially arranged circumferentially spaced openings 28. The passageway 27 communicates with the inlet passageway 11 and the openings 28 communicate with an annular space 30 between the inner end of the sleeve 19 and the poppet 15.

The valve seat 25 may be made as an integral part of the valve body but for convenience in manufacture a sleeve 31 is provided having an annular flange 32 which is positioned on an annular flat face 33 with the upper end of the sleeve forming the valve seat 25. The inner periphery of the sleeve 31 is substantially coincident with the cylindrical wall portion 34 of the bore 13 which provides an annular space 35 surrounding the poppet stem below the head 15 and which is in communication with the outlet passageway 12.

The poppet is diametrically enlarged at its inner end and is formed with a recess 37 in the underface thereof surrounding the valve stem 16 which provides an annular axially extending rim 38 at the inner end of the poppet. The rim 38 surrounds the upper end of the sleeve 31 when the poppet is seated on the valve seat 25. The clearance between the inner peripheral face of the rim 38 and the outer periphery of the sleeve 31 is a minimum whereby substantially no flow of the fluid takes place until the poppet is moved out of engagement with the sleeve.

In order to prevent leakage of the fluid through the valve, a flexible sealing ring 40 is arranged in the annular space between the sleeve 31 and the inner periphery of the valve body below the sleeve 19. The sealing ring 40 may be made of any suitable material such as rubber produced from latex or synthetic rubber produced from Buna material and the like. Such materials, however, have the tendency to "flow" or blow out when subjected to low pressure at the sealing edge and high pressure surrounding the remaining portion thereof or when the fluid flows through the valve at high velocity. To prevent this blowing out of the sealing ring, the arrangement is such that the sealing ring is subjected to the inlet pressure of the fluid so as to equalize the pressure on all faces thereof before the poppet is moved to open relation.

The sealing ring 40 may be of any preferred cross sectional configuration so as to fill the cavity in which it is positioned when compressed by the pressure of the poppet thereagainst. As illustrated, the same is of greatest thickness axially of the rim 38 and is formed with a medial radially extending portion 41 arranged between a backing ring 42 and the lower end of the sleeve 19, which sleeve extends inwardly beyond the innermost position of the poppet. The inner end of the sleeve 19 is narrowly spaced from the periphery of the rim 38 providing a narrow flow passageway therebetween so as to subject the sealing ring to the inlet pressure of the fluid.

The valve body is exteriorly threaded as at 43 for securing the valve in position with the poppet cap 18 disposed for convenient actuation thereof. The poppet 15 is moved to admit fluid through the valve by manually depressing the poppet cap 18. Upon initial opening movement, the poppet is freed from engagement against the sealing ring, so that the inlet fluid pressure is exerted against that portion of the sealing ring previously engaged by the rim and the pressure is equalized entirely about the ring. This takes place as soon as the rim of the poppet is moved away from the sealing ring and before the rim is moved out of engagement with the sleeve 31.

As the edge of the rim 38 moves past the valve seat 25, the flow of fluid will produce a suction immediately below the said rim. However, since the pressure is equalized entirely about the sealing ring the suction will not displace the ring.

What is claimed is:

In a valve construction, a valve body having inlet and outlet fluid passageways and an axial bore, an imperforate annular wall fixed in said valve body providing a valve seat at its inner end and being formed with a flanged outer end, said body having an annular recess surrounding said annular wall, a sleeve fixedly arranged in said bore and having a flow passageway establishing communication between said inlet passageway and said bore, a valve element mounted for reciprocatory movement within said sleeve and having an annular rim at its inner end slidably engaging said annular wall to dispose said valve element in seated engagement on said valve seat within said annular rim and with said annular rim snugly engaging about said annular wall so as to prevent appreciable flow of fluid between said annular rim and said annular wall until said annular rim is moved out of surrounding relation with said annular wall, a resilient sealing ring located in said annular recess and snugly fitting about said annular wall in spaced relation from said valve seat and adapted to be compressed by said annular rim when said valve element is moved to seated engagement on said valve seat, a backing ring seated on the flange of said annular wall at the outer periphery thereof and in engagement with the wall of said bore and the outer peripheral portion of said sealing ring, said sleeve extending inwardly beyond the inner end of said valve element when said valve element is seated on said valve seat, and said sleeve being narrowly spaced from the inner end portion of said valve element to permit of the flow of fluid from the flow passageway in said sleeve to said sealing ring whereby said sealing ring is subjected to the inlet pressure of the fluid when said valve element is in seated relation on said valve seat, and said sealing ring having a peripheral recess into which the inner end of said sleeve extends in spaced relation from said sealing ring whereby said sealing ring is subjected to the inlet pressure of the fluid in said recess.

References Cited in the file of this patent

UNITED STATES PATENTS

| | | |
|---|---|---|
| 565,682 | Jenkins | Aug. 11, 1896 |
| 1,563,590 | Rottel | Dec. 1, 1925 |
| 1,954,044 | Guildford | Apr. 10, 1934 |
| 1,962,558 | Guildford | June 12, 1934 |
| 2,069,297 | Abercrombie | Feb. 2, 1937 |
| 2,143,399 | Abercrombie | Jan. 10, 1939 |
| 2,685,296 | Boosman | Aug. 3, 1954 |
| 2,745,432 | Williams | May 15, 1956 |
| 2,885,176 | Bryant | May 5, 1959 |